(12) United States Patent
Delchev et al.

(10) Patent No.: US 12,555,065 B2
(45) Date of Patent: Feb. 17, 2026

(54) SELF-ADJUSTING MACHINE LEARNING SYSTEM AND METHODOLOGY FOR PREDICTION OF AUTO SHIPPING PRICES

(71) Applicant: Ship.Cars USA, LLC, Schaumburg, IL (US)

(72) Inventors: Marin Nikolaev Delchev, Sofia (BG); Rumen Milenov Mihaylov, Sofia (BG)

(73) Assignee: SHIP.CARS USA, LLC, Schaumburg, IL (US)

( * ) Notice: Subject to any disclaimer, the term of this patent is extended or adjusted under 35 U.S.C. 154(b) by 0 days.

(21) Appl. No.: 18/369,492

(22) Filed: Sep. 18, 2023

(65) Prior Publication Data
US 2024/0185172 A1    Jun. 6, 2024

Related U.S. Application Data

(60) Provisional application No. 63/429,234, filed on Dec. 1, 2022.

(51) Int. Cl.
| | | |
|---|---|---|
| *G06Q 10/0834* | (2023.01) | |
| *G06N 3/045* | (2023.01) | |
| *G06Q 30/0201* | (2023.01) | |

(52) U.S. Cl.
CPC ....... *G06Q 10/08345* (2013.01); *G06N 3/045* (2023.01); *G06Q 30/0206* (2013.01)

(58) Field of Classification Search
CPC ......... G06Q 10/08345; G06Q 30/0206; G06N 3/045
See application file for complete search history.

(56) References Cited

U.S. PATENT DOCUMENTS

| | | | | |
|---|---|---|---|---|
| 11,853,957 | B1* | 12/2023 | Scalabrino | ............. G06N 20/00 |
| 2017/0091669 | A1* | 3/2017 | Kuromatsu | ............ G06N 20/00 |
| 2018/0096300 | A1* | 4/2018 | Boye | .................... G06Q 10/067 |
| 2020/0118071 | A1* | 4/2020 | Venkatesan | ............ G06N 20/00 |
| 2020/0387797 | A1* | 12/2020 | Ryan | ..................... G06N 3/084 |

OTHER PUBLICATIONS

S. Kaźmierczak, "Prediction of the Costs of Forwarding Contracts with Machine Learning Methods," 2022 17th Conference on Computer Science and Intelligence Systems (FedCSIS), Sofia, Bulgaria, 2022, pp. 413-416, doi: 10.15439/2022F298. (Year: 2022).*

* cited by examiner

Primary Examiner — Resha Desai
Assistant Examiner — Danielle Elizabeth Zevitz
(74) Attorney, Agent, or Firm — McAndrews, Held & Malloy, Ltd.

(57) ABSTRACT

Methods, systems, and apparatuses are described herein for use of multiple machine learning models to improve automobile transportation cost prediction and transportation implementation. A computing device may generate two different trained machine learning models, with one configured to output a price prediction for automobile transportation and another configured to output a prediction of how an automobile transportation price will change over a time period. In response to receipt of a request for automobile transportation, the trained machine learning models might be used to generate a predicted price. Then, based on user activity, the predicted price and other transportation information may be transmitted to a server, and the machine learning models may be re-trained.

20 Claims, 10 Drawing Sheets

```
{
"pickup": {
"zip": "60607"
},
"delivery": {
"zip": "33607"
},
"vehicles": [
{
"year": 2017,
"make": "Ford",
"model": "F-250 Super Duty",
"running": true
}
],
"estimated_shipping_date": "2022-12-31"
}
```

Get an Instant Quote

- Transport Car FROM
- Transport Car TO
- Transport Type: Open | Closed

[ Next ]

First User Interface 1001

FIG. 10A

- Vehicle Year
- Vehicle Make
- Vehicle Model
- Is It Operable? Yes | No

[ Next ]

Second User Interface 1002

FIG. 10B

- E-Mail Address
- First Available Date
- Phone Number

[ Calculate Cost ]

Third User Interface 1003

FIG. 10C

- Discounted Cash Price $1269
- Regular Price $1339

Door to door transport. Includes insurance.

[ Continue to Book ]

Fourth User Interface 1004

FIG. 10D

SELF-ADJUSTING MACHINE LEARNING SYSTEM AND METHODOLOGY FOR PREDICTION OF AUTO SHIPPING PRICES

PRIORITY

This application claims priority to U.S. Provisional Patent Application No. 63/429,234, filed Dec. 1, 2022, which is incorporated by reference herein in its entirety.

FIELD OF USE

Aspects of the disclosure relate generally to automobile shipping automation using machine learning. More specifically, aspects of the disclosure may provide for improvements to the way in which computers process requests for automobile transportation and the way in which those computers automate and analyze aspects of the vehicle shipping process.

BACKGROUND

The automobile market often requires shipment of a vehicle (e.g., a car, a van, a motorcycle) from one location to another, since buyers and sellers are often not in the same location. For example, a buyer in Washington, D.C. might pay for a car to be shipped from Texas because the vehicle is desired for a variety of reasons (e.g., it is cheaper, has less rust damage, or the like). Traditionally, to determine the price of such transportation, domain experts develop detailed price matrices and handcrafted rules to predict the price of automobile transport. With that said, this approach has numerous limitations: the matrices and rules must be continually updated, and unexpected changes in market forces are difficult to reflect in such matrices. In fact, the maintenance complexity grows when the business and the demand for predictions grows, leading to bad price predictions and costly mistakes. Moreover, such a process has a key limitation: because it often involves static matrices and rulesets, the process is not automated, cannot account for modifications to other transportation routes, and generally introduces undesirable delay. In turn, price fluctuations due to unknown market fluctuations can make quotes incorrect. Moreover, the fundamentally human-driven aspects of this process make automation impractical.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to using a unique configuration of multiple machine learning models to process automobile transportation requests and to generate accurate cost predictions. The process described herein uses at least two different machine learning models: a first trained machine learning model configured to output a price prediction for automobile transportation at the present time, and a second trained machine learning model configured to output a prediction of how an automobile transportation price will change over a time period. When a user provides a request for automobile transportation via a user interface, additional data (e.g., information about the vehicle to be moved) is collected, and then data from that request and additional data is provided to the first trained machine learning model. That first trained machine learning model might then output a predicted automobile transportation price (e.g., $1000 for transporting a sportscar from New York to Texas). That predicted automobile transportation price might be provided to the second machine learning model, which might provide output that indicates how the predicted automobile transportation price might change between when the request was received and when the transportation is actually scheduled (e.g., a 10% increase from now to the requested shipping time, meaning a price of $1100). That information might be displayed to a user, and the user can accept and/or reject the price. The fact that the user accepted/rejected the price might be used to further train the model, such as to indicate that the price might have been unexpected and/or undesirably high. Moreover, when the user accepts the price, the process might automate some or all of the automobile transportation process. For instance, origin and destination information might be sent to a GPS system, and/or a reservation might be logged in a database.

More particularly, a computing device may generate a first trained machine learning model by training, based on first training data indicating a history of automobile shipping costs and corresponding shipment information, a first machine learning model to output a price prediction for automobile transportation. Training the first machine learning model may comprise weighting, based on the first training data, one or more first nodes of a first artificial neural network. The computing device may also generate a second trained machine learning model by training, based on second training data indicating a history of automobile shipping costs over time, a second machine learning model to output a prediction of how an automobile transportation price will change over a time period. Training the second machine learning model may comprise weighting, based on the second training data, one or more second nodes of a second artificial neural network. Prior to the training, the computing device may weight different portions of the first training data based on a recency of each different portion of the first training data. The computing device may receive, via a user interface of an application executing on a user device, a request for automobile transportation that indicates an origin location, a destination location, a vehicle identifier, and a transportation time. The computing device may then receive, from a database and based on the vehicle identifier, vehicle data and provide, as input to the first trained machine learning model, the origin location, the destination location, and the vehicle data. Then, the computing device may receive, as output from the first trained machine learning model, a predicted automobile transportation price and provide, as input to the second trained machine learning model, the predicted automobile transportation price and the transportation time. The computing device may receive, as output from the second trained machine learning model, a predicted price change. The predicted price change may comprise a comparison between the transportation time and a time when the request for automobile transportation is received. The computing device may generate a modified price prediction by modifying the predicted automobile transportation price based on the predicted price change and may cause output, in the user interface, of the modified price prediction. Then, based on receiving, via the user interface, user input, the computing device may perform a variety of tasks. For example, the computing device may transmit, to a server, an indication of the request for automobile transportation and the modified price prediction, may further train the first trained machine learning model based on the user input, and/or may transmit, to a Global Positioning System (GPS) device, an indication of the destination location.

The computing device may monitor activity of the trained machine learning model to improve those models predictive abilities. For example, the computing device may determine a predicted automobile transportation price prediction trend by monitoring output from the first trained machine learning model. The computing device may then, based on determining that the predicted automobile transportation price prediction trend satisfies a threshold (e.g., suggesting that the trained machine learning model is skewing in an undesirable direction, such as predicting prices too high), discard (e.g., stop using) the first trained machine learning model, update the first training data by modifying one or more portions of the first training data (e.g., removing high values in the first training data), and generate a new version of the first trained machine learning model by training, based on the updated first training data, the first machine learning model to output the price prediction for automobile transportation. That new version of the first trained machine learning model may be thereby trained to avoid the undesirable predicted automobile transportation price prediction trend.

The computing device may periodically update one or more of the trained machine learning models. For example, the computing device may determine a time associated with the generation of the first trained machine learning model. Then, based on determining that the time satisfies a threshold, the computing device may discard (e.g., stop using) the first trained machine learning model, update the first training data (e.g., to contain newer data), and generate a new version of the first trained machine learning model by training, based on the updated first training data, the first machine learning model to output the price prediction for automobile transportation. In this manner, the new version of the first trained machine learning model may be trained on the latest data available.

The training data may comprise a wide variety of information usable to train machine learning models regarding transportation pricing. For example, the corresponding shipment information may indicate information such as vehicle weight, vehicle dimensions, whether a vehicle is capable of being driven, and/or whether the vehicle is transported in a closed container.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 7 shows an example of a JSON payload that may be submitted as part of a request for automobile transportation.

FIG. 10A shows an example user interface for receiving a request for automobile transportation, focusing on origin and destination information.

FIG. 10B shows an example user interface for receiving a request for automobile transportation, focusing on vehicle make, model, year, and operability information.

FIG. 10C shows an example user interface for receiving a request for automobile transportation, focusing on contact information and availability information.

FIG. 10D shows an example user interface for providing a quote.

DETAILED DESCRIPTION

Figure 1:
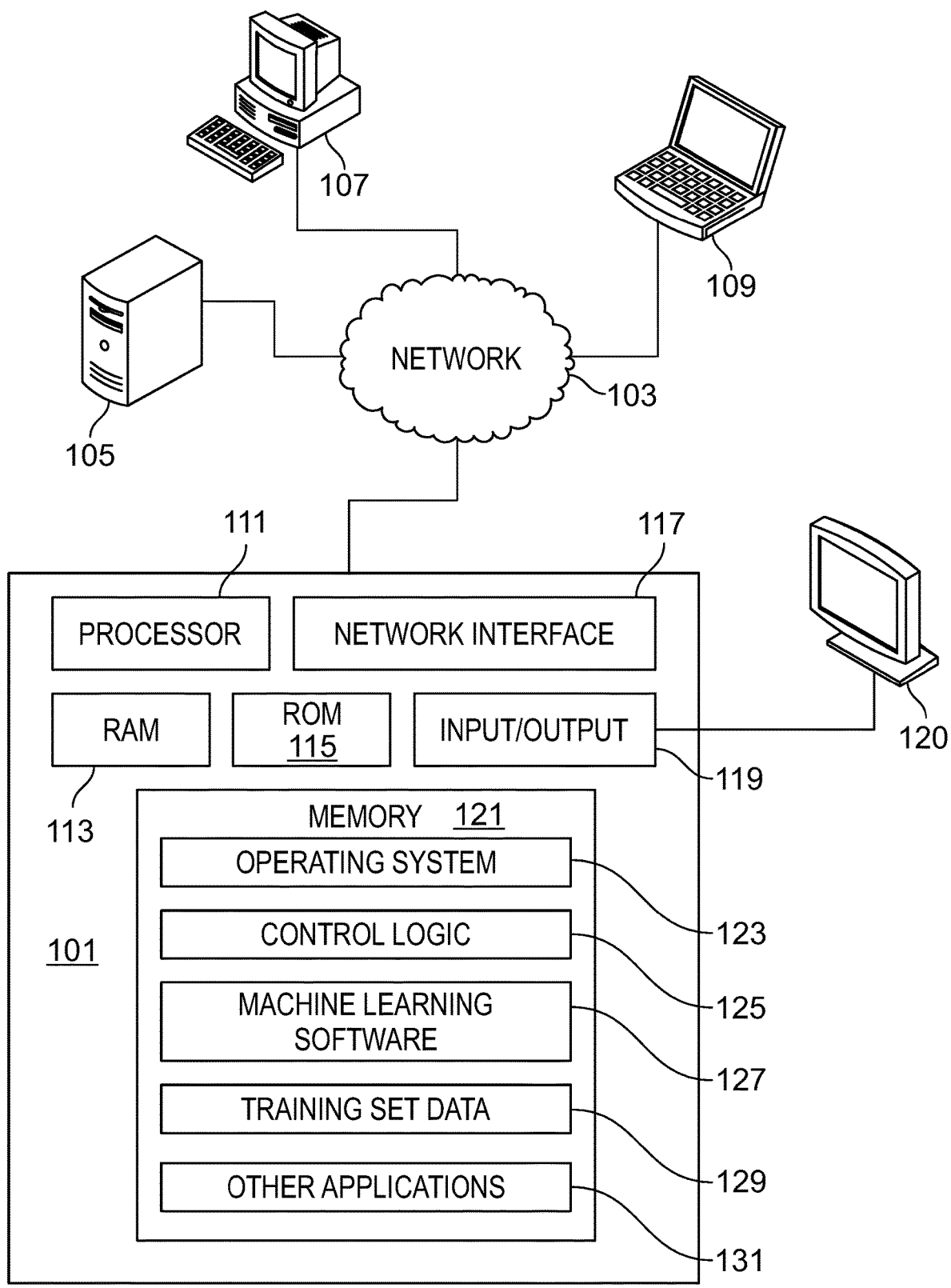
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, manual predictions of automobile transportation costs can be unreliable, time-consuming, and difficult to automatically implement. For example, some automobile transportation companies apply flat fees to automobile transport, but such flat fees cannot accurately account for transportation difficulties, market fluctuations, and generally are not reliable enough to be used for automated vehicle transport. Along those lines, some companies purport to maintain complex shipping matrices and shipping rules to account for such unpredictability and hire staff to implement such quotes: however, these approaches are rarely adequate and can result in unexpected losses. The process depicted herein involves a process whereby at least two different machine learning models are trained: one is designed to predict costs at the present time (that is, when the request is received), and another is designed to predict differences between costs at a certain time and costs at a future time (that is, when the transportation is actually requested). In this manner, use of both trained machine learning models can result in automobile transportation cost predictions that are not only robust (in that they can consider a wide variety of data), but also accurate over time (because the second machine learning model can accurately predict the cost at some future time). A number of different improvements come as a result of this process: for example, user activity in response to a quote can be used to automate aspects of the vehicle transportation process and/or to further improve the accuracy of the machine learning models.

In turn, the present invention encompasses a computer-based system that enables its users to enter data regarding the desired automobile shipment, and a server-based software platform analyzes that data to provide a more accurate prediction of the cost of shipping that automobile. The system of the present invention implements software that performs steps such as data collection, data processing, model training, and prediction. With respect to data collection, the present disclosure collects data for the most recent orders and historical data for the market state throughout the years and then aggregates, transforms, and processes that data. With respect to model training, and once the data is collected and processed, the present disclosure software uses it to train two machine learning models: a base model and a correction model. The base model (referred herein as a first trained machine learning model) is configured to predict the shipment prices for the current state of the market. The first trained machine learning model is thereby responsible for outputting the most accurate price prediction if a vehicle is about to be transported immediately, at the current market state. This model might be updated frequently (e.g., daily). In contrast, the correction model (referred herein as a second trained machine learning model) is configured to address seasonality of the market. Often, users of the system make requests for transportation of vehicles that will only be available in a couple of weeks, or even months, in the future. If only the price prediction from the current market state is used, the predicted price may be too high or too low when the actual time for shipment arrives. As such, the second trained machine learning model may be configured to predict how the current market price will change in the future when the vehicle is available for transportation. The second trained machine learning model may be automatically updated less frequently, e.g., once every couple of months. With respect to prediction, each day, the trained machine learning models may be automatically reloaded and used for price predictions. As will be detailed below, the use of both models (e.g., the modification of predictions of the first trained machine learning model based on output from the second trained machine learning model) provides accurate and robust price predictions. In particular, and as will be elaborated later, the aspects described herein improve the way in which computers are able to receive requests for transport and process those requests to accurately predict unknown values (e.g., future automobile transportation prices) by using multiple machine learning models trained using particularly-processed sets of data and by using particular relationships of computing devices. This is quite different from existing implementations, which use price matrices, rulesets, and hand-programmed algorithms which are significantly less accurate (and thus result in unintended costs for customers/shippers/middlemen).

As an example of how the present disclosure may operate, a user may use an online form to submit a request for automobile transportation, such as a request to have a sports utility vehicle to be moved from California to North Carolina. That request might comprise information such as the make and model of the car (e.g., Volvo XC90), the origin location (e.g., California), the destination location (e.g., North Carolina), and a transportation time (e.g., one month from now). Based on the car information, additional information (e.g., vehicle length, weight, width, whether the vehicle needs to be transported in a closed container) may be retrieved from an external database. Then, the request information and additional information may be provided to the first trained machine learning model, which might respond with a predicted automobile transportation price (e.g., $1,000). That predicted automobile transportation price might be provided to the second machine learning model, which might provide an indication of a difference in price (e.g., 1.2, that is, a 20% increase) between the current time and the time the transportation is requested (e.g., a month from now). The adjusted price (e.g., $1,200) might be displayed in a user interface. Then, user activity in response to that price might be implemented in a variety of ways. For example, if the time period requested is sufficiently soon, data might be sent to a GPS system of a driver, in effect directing them to a pick-up location. As another example, if the user activity indicates that the price is too high and/or too low, that response might be used to further train either or both of the trained machine learning models. As yet another example, the request might be added to a queue (e.g., a queue of jobs maintained by a shipping company).

Aspects described herein act as a practical implementation of automobile price quotes and improve computers. The system described herein involves multiple machine learning models, the processing of disparate amounts of large quantities of data, and automation steps such as the transmission of data to GPS devices. In this manner, the present disclosure is not related to machine learning alone or price quotations alone, but rather involves a very specific and practical implementation of different computing devices and computing device processes to provide a computer-implemented improvement to data processing and quote implementation. Indeed, one of the many advantages of the present disclosure is the fact that it can perform steps (e.g., the training of machine learning models and use thereof, the handling of large quantities of data from a variety of sources at a quick pace) that cannot be performed by a human or in the human mind. In fact, many of the aspects of the present invention (e.g., the periodic training of machine learning models based on large quantities of data selected from a moving window) could not be performed by a human being whatsoever.

One way in which the present disclosure acts as an unexpected improvement to the functioning of computers is the way in which it uses two different trained machine learning models. Based on testing, use of a single trained machine learning model (e.g., training such a model every six months based on large volumes of data) has significant flaws: it could perform well only on orders that would be executed immediately, it failed to handle price fluctuations (e.g., it could not react to market changes such as gas price fluctuations), and it generally was cumbersome because of the "all or nothing" style training required. The present disclosure, by virtue of using multiple trained machine learning models with different training/updating frequencies surprisingly remedies these issues by providing future price quotes in a manner that can quickly react to market changes, and in a manner that allows iterative and relatively more gentle training of the machine learning model.

A comparison of legacy price prediction systems and the present disclosure illustrates how the present disclosure provides a marked and unexpected improvement to a computer's ability to assist in the process of predicting automobile shipping prices. Legacy price prediction systems required maintenance of static pricing matrices which were updated whenever problems were detected. For example, a pricing matrix might indicate that, for a sedan being picked up from New York and being delivered in California, the price per mile was $1.10, whereas, for a van being picked up in Texas and being delivered to Washington, the price per mile was $1.70. In turn, these pricing matrices were extremely inflexible, sometimes premised on guesswork, and would only be updated in the case where significant deviations were identified.

As part of developing the present disclosure, the accuracy of the predictions was measured by calculating the weekly Mean Absolute Error (MAE). The MAE was computed by subtracting the price prediction generated in accordance with the present disclosure from the actual price paid to carriers for each order, then determining the mean value of that figure. For example:

MAE=abs(Predicted Carrier Pay−Actual Carrier Pay)

The calculations revealed that the computing device of the present disclosure reduced weekly MAE by approximately 15%. Moreover, by tracking the hours required to manually manage legacy prediction systems in comparison to the process described herein, it was determined that approximately 220 person-hours of domain experts' involvement was not required. Further still, these improvements were observed to reduce the amount of customer complaints significantly (from approximately four complaints per month to one complaint every two months), strongly suggesting an improvement in accuracy.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., key board, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
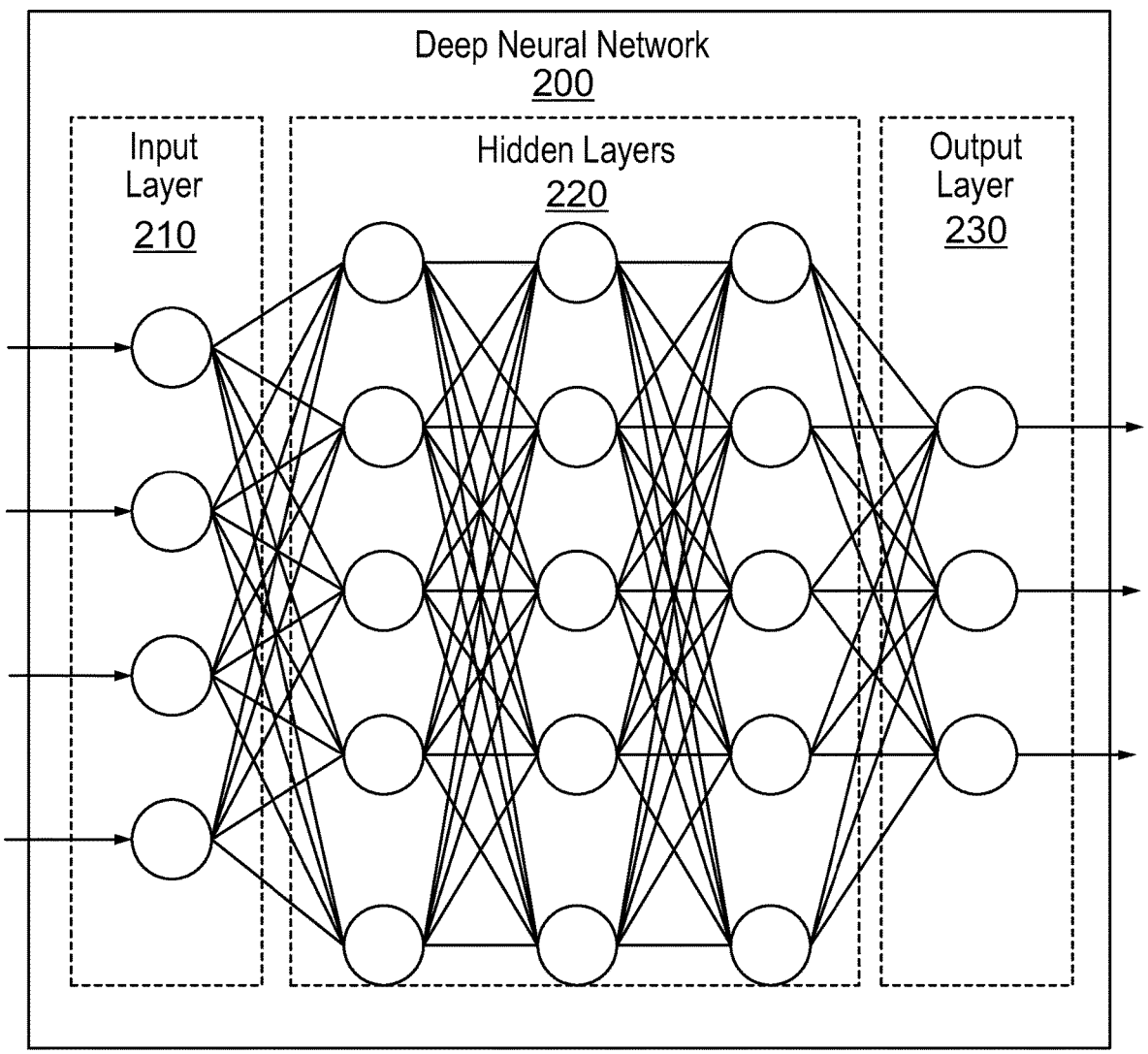
FIG. 2 depicts an example deep neural network architecture for a model according to one or more aspects of the disclosure.

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
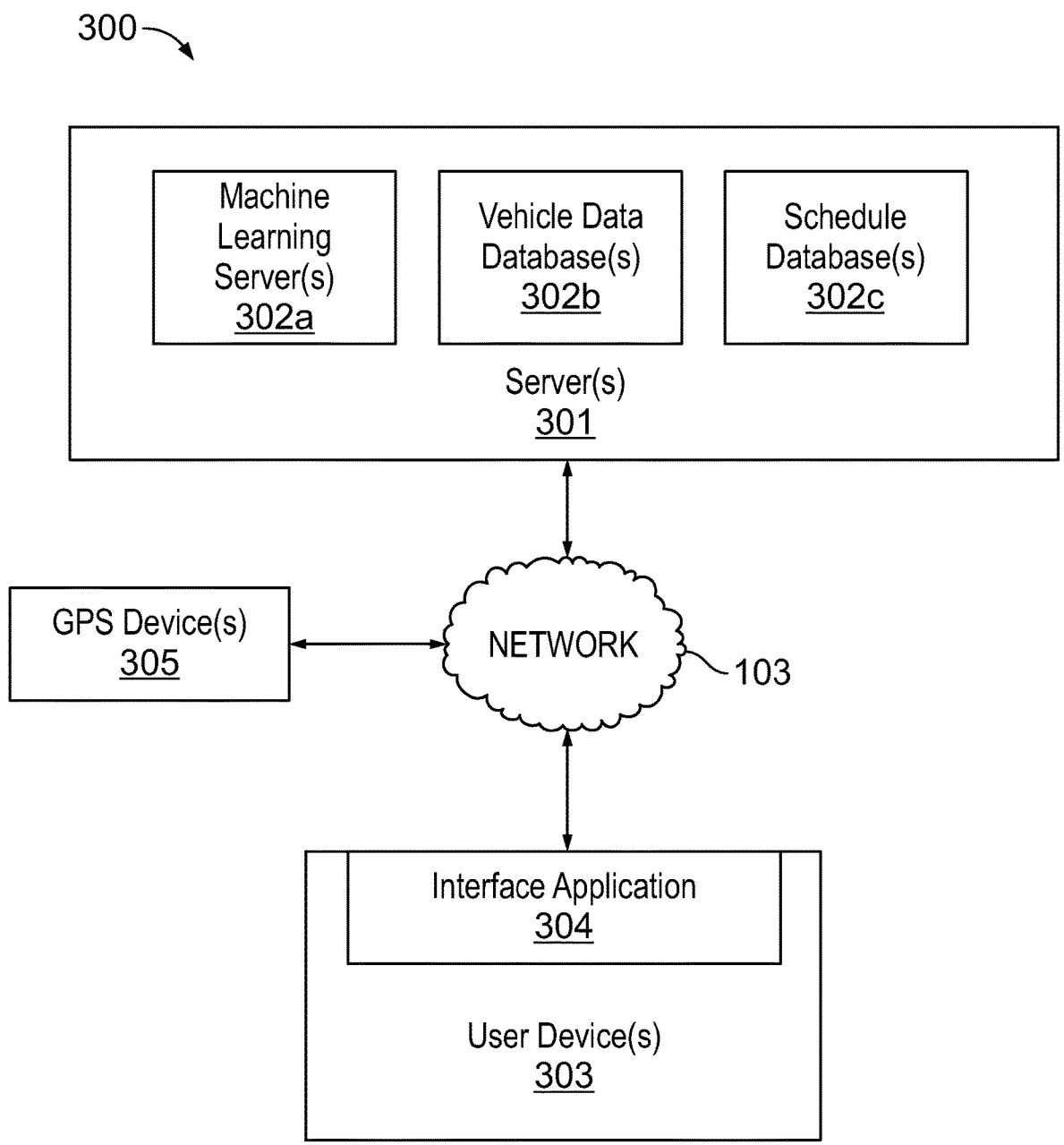
FIG. 3 depicts a system comprising servers and user devices.

FIG. 3 depicts a system 300 comprising one or more servers 301 (that include one or more machine learning servers 302a, one or more vehicle data databases 302b, and one or more schedule databases 302c) communicatively coupled, via the network 103, to one or more user devices 303 and one or more GPS devices 305. The one or more user devices 303 are shown as comprising (e.g., executing) an interface application 304. The one or more servers 301 and/or the one or more user devices 303 may comprise computing devices, such as computing devices that comprise one or more processors and memory storing instructions that, when executed on the one or more processors, cause the performance of one or more steps. The one or more servers 301 and/or the one or more user devices 303 may comprise any of the devices depicted with respect to FIG. 1, such as one or more of the computing devices 101, 105, 107, and/or 109.

The one or more machine learning servers 302a may be one or more computing devices configured to train, execute, provide input to, and/or receive input from machine learning models. For example, the one or more machine learning servers 302a may implement the deep neural network architecture 200 of FIG. 2. As part of a process of training a machine learning model, the one or more machine learning servers 302a may collect training data, process that training data, provide the training data to one or more input nodes of an artificial neural network, and test the trained machine learning model using one or more testing data sets. Such testing data sets may comprise all or portions of the training data. As part of the process of providing input to a trained machine learning model, the one or more machine learning servers 302a may provide, via one or more input nodes of a trained machine learning model, data. As part of the process of receiving output from a trained machine learning model, the one or more machine learning servers 302a may receive, via one or more output nodes of an artificial neural network, output data (e.g., Boolean values, numbers, words, images, audio, or the like).

One example of a machine learning algorithm which may be used herein is the model LGBMRegressor, which implements a gradient boosting machine learning technique. Gradient boosting is a machine learning technique used in regression and classification tasks, among others. Gradient boosting gives a prediction model in the form of an ensemble of weak prediction models, which are typically decision trees. When a decision tree is the weak learner, the resulting algorithm is called gradient-boosted trees, and such an approach usually outperforms random forest. A gradient-boosted trees model is built in a stage-wise fashion as in other boosting methods, but it generalizes the other methods by allowing optimization of an arbitrary differentiable loss function.

The one or more vehicle data databases 302b may comprise information about vehicles, such as whether a vehicle is a classic vehicle (e.g., is older than a predetermined year), vehicle length, vehicle width, vehicle height, whether the vehicle is manual or automatic, the make and model of the vehicle, known operational issues with the vehicle, the number of seats in the vehicle. Computing devices may query the one or more vehicle data databases 302b to determine information about a vehicle to be transported. For example, a computing device might receive an indication of a make, model, and year of a vehicle, then query the one or more vehicle data databases 302b to determine the dimensions and weight of the vehicle.

The one or more schedule databases 302c may be configured to store information about past and future vehicle transportation activity. The one or more schedule databases 302c may be configured to store a history of vehicle shipments, including the price of the shipment, the make and model of the vehicle, the origin location and destination location of the shipment, and the like. Additionally and/or alternatively, the one or more schedule databases 302c may be configured to store future automobile transportation requests. For example, if a user approves a quote for a vehicle transportation request, then information corresponding to that request (e.g., origin location, destination location, vehicle make, model, and year, agreed quote, and applicable time(s)) may be added as an entry to the one or more schedule databases 302c.

The one or more user devices 303 may be configured to implement the interface application 304 (e.g., a web browser, a custom application) and may be configured to permit users to submit requests for automobile transportation. Such requests might be transmitted via an Application Programming Interface (API) and/or via the Hypertext Transfer Protocol (HTTP), which may receive data such as a origin location (e.g., a pickup zip code, such as the US postal code of the district or region from which the vehicle will be picked up and sent), a destination location (e.g., a delivery zip code, such as the US postal code of the district or region from which the vehicle will be picked up and sent), a list of vehicles to be transported (and, e.g., a year, make, model, VIN, and/or running indication of each vehicle), an estimated shipping date for the vehicle(s) (e.g., as entered in the ISO-8601 format), and/or an indication of whether the vehicle(s) are to be transmitted in an enclosed vehicle.

The one or more GPS devices 305 may be configured to receive location information (e.g., names of points of interest, GPS coordinates) and provide directions based on that location information. For example, upon receipt of origin location and destination location, the one or more GPS devices 305 may be configured to route a driver to the origin location (e.g., to pick up vehicle(s)), and then route the driver to the destination location (e.g., to drop off the vehicle(s)).

Discussion will now turn to examples of how the multiple machine learning models referenced above may be used to generate accurate and timely automobile transportation quotes, and how responses to those quotes might be automatically implemented.

Figure 4:
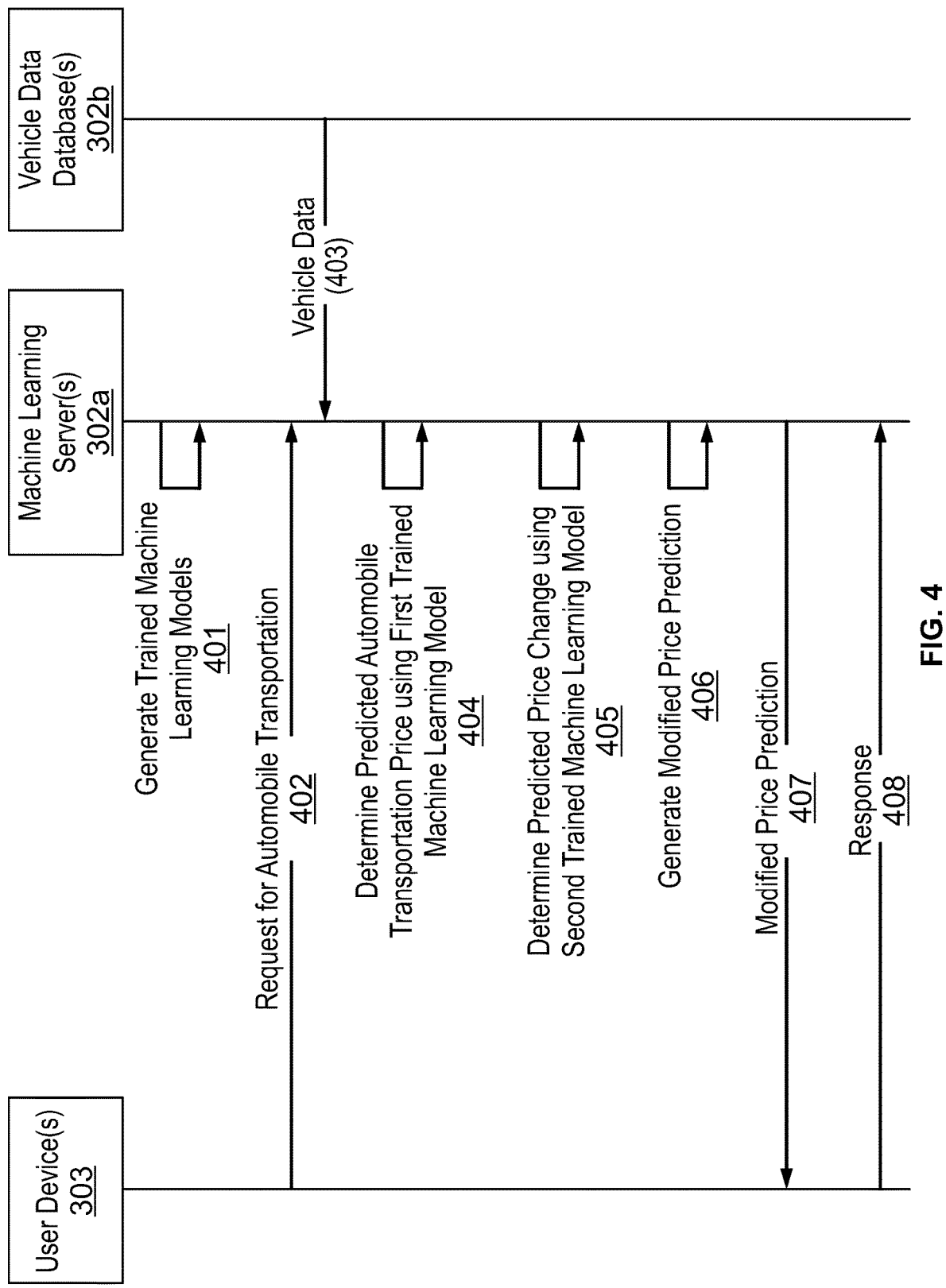
FIG. 4 depicts a message flow depicting use of two machine learning models for automobile transportation prediction.

FIG. 4 depicts a message flow depicting use of two machine learning models for automobile transportation prediction. The message flow depicted in FIG. 4 is illustrative and represents one way in which the present disclosure may be implemented. Many of the steps depicted in FIG. 4 may be omitted and/or rearranged as desired. Moreover, many of the steps are elaborated in more detail below with respect to FIG. 5.

In step 401, the one or more machine learning servers 302a may generate trained machine learning models, such as a first trained machine learning model and a second trained machine learning model. As part of this process, the one or more machine learning servers 302a may collect training data for each of the different trained machine learning models, process that data (e.g., to dedupe the data, improve the accuracy of the data, or the like), and train different artificial neural networks based on that data. The result of such a process may be that the first trained machine learning model may be configured to output, in response to input, a price prediction for automobile transportation, and that the second trained machine learning model may be configured to, in response to input, output a prediction of how an automobile transportation price will change over a time period. As will be detailed further below; a large amount of data may be required in order to capture the seasonality of the market. With that said, each trained machine learning model may be trained with training data from a predetermined time period, and each trained machine learning model may be re-trained on a periodic basis.

In step 402, the one or more machine learning servers 302a may receive, form the one or more user devices 303, a request for automobile transportation. The request may comprise information such as an origin location and destination location (e.g., GPS coordinates for each), a vehicle identifier (e.g., a make, model, year, VIN, or the like), and/or a transportation time (e.g., a time when transportation is desired, whether now or in the future). Such a request might be submitted through an application, such as the interface application 304, and might be transmitted via an API.

In step 403, the one or more machine learning servers 302a may receive, from the one or more vehicle data databases 302b, vehicle data. The vehicle data may comprise any information that might be determined based on all or portions of the information provided via the request received in step 402. For example, as part of step 403, the one or more machine learning servers 302a may use make, model, and year information from the request received in step 402 to query the one or more vehicle data databases 302b for additional information (e.g., vehicle length, height, width, weight, and the like).

In step 404, the one or more machine learning servers 302a may determine a predicted automobile transportation price using the first trained machine learning model. The data received from the request in step 402 and the data received in step 403 may be provided as input to the first trained machine learning model, and the first trained machine learning model may respond with a predicted automobile transportation price. This predicted automobile transportation price may correspond to the price to transport the requested vehicle(s) at the time the request is received in step 402.

In step 405, the one or more machine learning servers 302a may determine a predicted price change using the second trained machine learning model. Because the predicted automobile transportation price determined in step 404 might correspond to the price to transport the requested vehicle(s) at the time the request is received in step 402, the second trained machine learning model may be used to predict a change in the price over time. In turn, the input provided to the second trained machine learning model may comprise, for example, an indication of a time that the request from step 402 was received and an indication of when the automobile transportation is requested. In response the second trained machine learning model may output a predicted price change. Such a predicted price change might be, for example, a value that, when multiplied by the predicted automobile transportation price, results in a future predicted automobile transportation price at the time the automobile transportation is requested.

In step 406, the one or more machine learning servers 302a may generate a modified price prediction. For example, the modified price prediction may be generated by multiplying the predicted automobile transportation price with the predicted price change. As another example, modified price prediction may be generated by altering the predicted automobile transportation price based on the predicted price change.

In step 407, the one or more machine learning servers 302a may send, to the one or more user devices 303, the modified price prediction. For example, the one or more machine learning servers 302a may cause the one or more user devices 303 to indicate, to a user, a predicted price for the requested automobile transportation at the time requested by the user.

In step 408, the one or more machine learning servers 302a may receive, from the one or more user devices 303, a response. The response may be to accept the quote. In such a circumstance, the one or more machine learning servers 302a may take steps to implement the requested automobile transportation, such as adding an indication of the request to the one or more schedule databases 302c, transmitting GPS information to the one or more GPS devices 305, and/or training one or both of the machine learning models. The response may also be to reject the quote. In such a circumstance, the one or more machine learning servers 302a may further train the machine learning models.

To provide an example of how the message flow in FIG. 4 might operate from the perspective of a user, a user might, on August 1, use the interface application 304 of the one or more user devices 303 to request that a 2016 GMC Yukon Denali be moved from San Antonio, Texas to San Francisco, California on August 23. As part of step 403, the one or more machine learning servers 302a may use the request information (e.g., the year (2016), the make (GMC), the model (Yukon Denali)) to query the one or more vehicle data databases 302b to determine vehicle weight, width, height, and length (5784 pounds, 80.5", 74.4", 203.9"). The collected information (both from the request in step 402 and as part of step 403) may be provided to the first trained machine learning model, which might provide a predicted automobile transportation price (e.g., $2,500). Then, the timing information ($2,500, August 1, August 23) may be provided the second trained machine learning model, which may output a predicted price change (e.g., 5% increase in price from August 1 to August 23). The predicted automobile transportation price may be multiplied by the predicted price change to generate a modified price prediction ($2,625) as part of step 406. That modified price prediction might then be provided back to the interface application 304, and the user might be provided the opportunity to accept or reject the quote.

Figure 5:
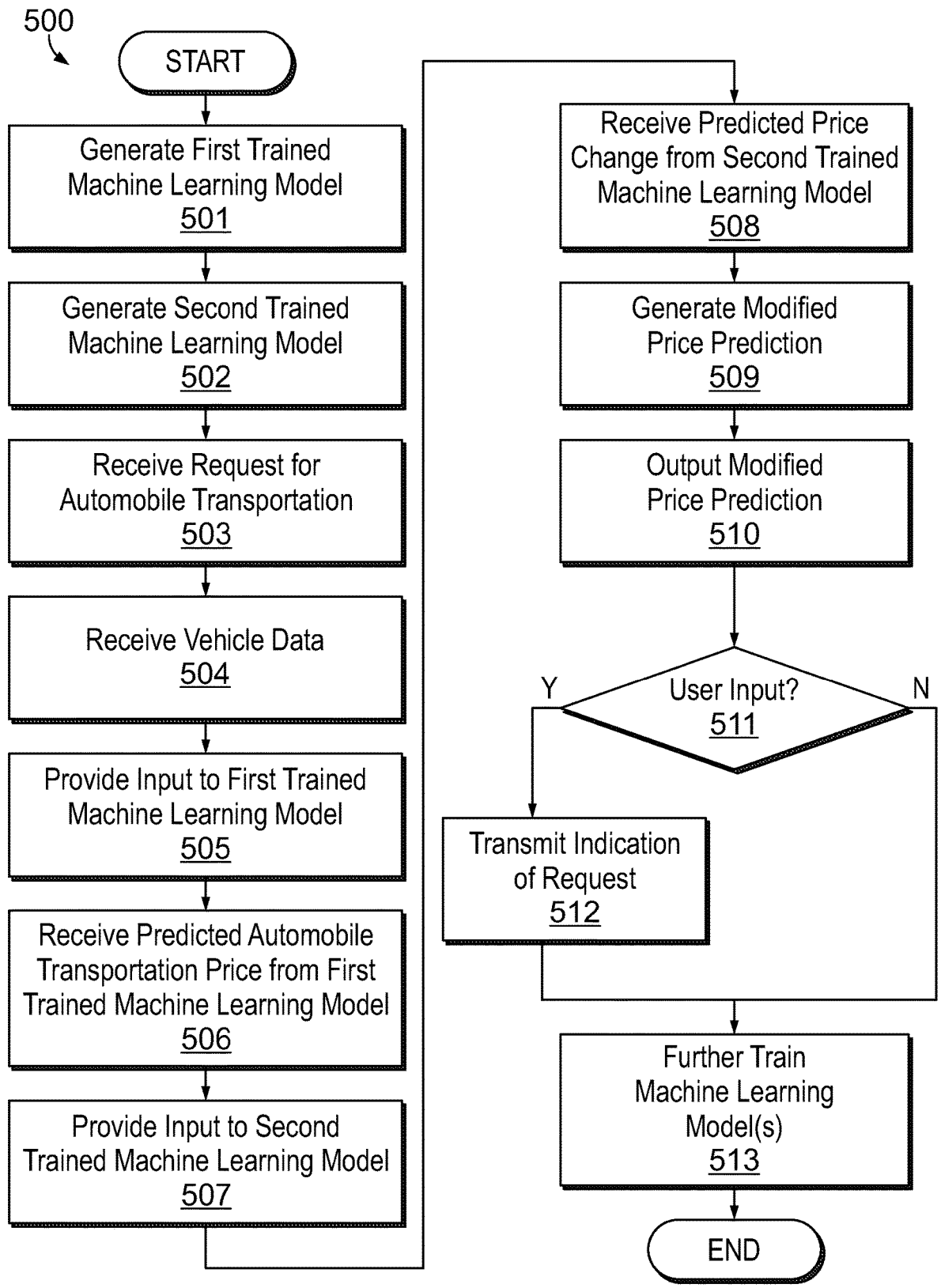
FIG. 5 depicts a flow chart comprising steps which may be performed to predict automobile transportation prices.

FIG. 5 depicts a flow chart depicting a method 500 comprising steps which may be performed by the one or more machine learning servers 302*a*. The method 500 may, in some ways, be viewed as a more detailed form of the steps depicted in FIG. 4, with particular focus on steps taken by the one or more machine learning servers 302*a*. A computing device may comprise one or more processors and memory storing instructions that, when executed by the one or more processors, cause performance of one or more of the steps of FIG. 5. One or more non-transitory computer-readable media may store instructions that, when executed by one or more processors of a computing device, cause the computing device to perform one or more of the steps of FIG. 5. Additionally and/or alternatively, one or more of the devices depicted in FIG. 3, such as the one or more servers 301 and/or the one or more user devices 303, may be configured to perform one or more of the steps of FIG. 5. Moreover, all or portions of the steps of FIG. 5 may be the same or similar as the elements and concepts depicted with respect to FIG. 4. For simplicity, the steps below will be described as being performed by a single computing device: however, this is merely for simplicity, and any of the below-referenced steps may be performed by a wide variety of computing devices, including multiple computing devices.

Discussion will begin with step 501 and step 502, which may be the same or similar as step 401 of FIG. 4. In step 501, the computing device may generate a first trained machine learning model. This process may entail collecting first training data (e.g., data about a history of automobile shipping costs and information about the vehicles shipped) and using all or portions of that data to train an artificial neural network, such as that described with respect to FIG. 2. For example, the computing device may generate a first trained machine learning model by training, based on first training data indicating a history of automobile shipping costs and corresponding shipment information, a first machine learning model to output a price prediction for automobile transportation. Training the first machine learning model may comprise weighting, based on the first training data, one or more first nodes of a first artificial neural network. The first trained machine learning model might not be concerned with how the price will change when the order is actually available for delivery in the future (e.g., when the shipment is actually requested); rather, it may be configured to predict the price of the order if it is desired to transport the vehicle immediately under the current market conditions.

It may be desirable to perform step 501 on a regular (e.g., periodic) basis so as to ensure that the first trained machine learning model is accurate based on the latest data available. After all, one goal of the first trained machine learning model may be to predict the price for the current state of the market, meaning that the first trained machine learning model should be updated to continually reflect the current state of the market. In other words, it may be essential to keep the first trained machine learning model up to date with any market tendencies. In order to achieve that goal, the first trained machine learning model may be trained periodically (e.g., daily) with the most recent data from the previous day while excluding the most outdated data. Each data point in the training data may be given a weight that decreases with time. For example, in the training data, the more recent the data is, the higher the importance it may be given during training. As another example, as part of training the first trained machine learning model, the training data may be configured such that it includes data from a previous period (e.g., the previous day) and excludes data from excessively old periods of time (e.g., days furthest in the past). In other words, a moving window of configurable size may be used when selecting which portions of the training data to use to train the first trained machine learning model. Moreover, different portions of the training data may be weighted based on its recency. For example, the computing device may weight different portions of the first training data based on a recency of each different portion of the first training data.

An example of types of information that may be present in the training data for the first trained machine learning model is provided below in Table 1.

TABLE 1

| Variable Name | Description |
| --- | --- |
| relative_week | The difference between the date that a cost prediction was generated and when the vehicle was available for pickup |
| distance | Distance of vehicle transportation |
| enclosed | Whether the vehicle(s) were transported in an enclosed container |
| operable | Whether the vehicle(s) were operable |
| classic | Whether the vehicle(s) are collectible/old |
| weight | Weight of the vehicle |
| length | Length of the vehicle |
| height | Height of the vehicle |
| lat | Latitude coordinates of the origin (e.g., pickup) location |
| lng | Longitude coordinates of the origin (e.g., pickup) location |
| lat_delivery | Latitude coordinates of the destination (e.g., drop off) location |
| lng_delivery | Longitude coordinates of the destination (e.g., drop off) location |
| elevation | Elevation of the origin (e.g., pickup) location |
| elevation_delivery | Elevation of the destination (e.g., drop off) location |
| housing_density | The housing |
| housing_units | Number of units of housing at the origin (e.g., pickup) location |
| housing_units_delivery | Number of units of housing at the destination (e.g., drop off) location |
| land_area | Land area at the origin (e.g., pickup) location |
| land_area_delivery | Land area at the destination (e.g., drop off) location |
| population | Population at the origin (e.g., pickup) location |
| population_delivery | Population at the destination (e.g., drop off) location |
| population_density | Population density at the origin (e.g., pickup) location |
| population_density_delivery | Population density at the destination (e.g., drop off) location |
| water_area | Water area at the origin (e.g., pickup) location |
| water_area_delivery | Water area at the destination (e.g., drop off) location |
| shipper_id | Identifier of the shipper |

In the context of training the first trained machine learning model, the target variable may comprise the price paid to one or more carriers for transporting the vehicle. This target variable may be selected so as to reduce model error.

In step 502, the computing device may generate a second trained machine learning model. The second trained machine learning model might be trained using second training data that relates to historical automobile shipping costs over time. For example, the computing device may generate a second trained machine learning model by training, based on second training data indicating a history of automobile shipping costs over time, a second machine learning model to output a prediction of how an automobile transportation price will change over a time period. Training the second machine learning model may comprise weighting, based on the second training data, one or more second nodes of a second artificial neural network. As indicated above, one goal of the second trained machine learning model may be to predict how much the market will change between the current date and the future date when the vehicle will be available for transportation. In other words, the second trained machine learning model may be configured to output the expected change to a price (e.g., in a percentage). For example, the second trained machine learning model may state that the current price for order X will increase by 5% after two weeks, or it will decrease by 4% in after three weeks.

The training data used to train the second trained machine learning model may be in some ways different than the data used to train the first trained machine learning model. An example of types of information that may be present in the training data for the second trained machine learning model is provided below in Table 2.

TABLE 2

| Variable Name | Description |
| --- | --- |
| prediction_week | The number of the week when the prediction is being made |
| first_available_date | The number of the week when the vehicle will be available for pickup |
| distance | Distance of vehicle transportation |
| enclosed | Whether the vehicle(s) were transported in an enclosed container |
| operable | Whether the vehicle(s) were operable |
| classic | Whether the vehicle(s) are collectible/old |
| weight | Weight of the vehicle |
| from_state_encoded | The pickup state |
| to_state_encoded | The delivery state |
| from_region_encoded | The standard federal region of the pickup |
| to_region_encoded | The standard federal region of the delivery |

When training the second trained machine learning model, the target variable may comprise a fraction, where the denominator may comprise the actual carrier pay in the week the car is dispatched, and where the numerator is the price predicted by the first trained machine learning model in week Y when the first forecast for the price was made. For example, if the current week is number 39 but the car will be available in week 42, then the first trained machine learning model prediction for week 39 is the numerator and the actual price paid in week 42 is the denominator.

The second trained machine learning model may be configured in a manner which provides a degree of price variability protection. It may be desirable to ensure that price quotes are consistent and stable, even when dates and/or other variables change. One way to address this problem is to ensure that the first trained machine learning model is trained with a sufficient quantity of data. That said, additional steps may be taken to provide a degree of price variability protection. For example, the variability coming from the second trained machine leering model may be restricted by smoothing the absolute weekly change of the predicted fraction to be within a predetermined percentage. This may be achieved by generating multiple predicted fractions for nearby weeks. For example, if a user requests a price prediction for 2023 Dec. 25, internally the second trained machine leering model may be configured to generate fractions for a week before and for a week after that date. This approach may ensure there are no sharp spikes in the consecutive fractions by smoothing them with appropriate mathematical methods (e.g. linear interpolation). The resulting fraction may be used in the final prediction, which may guarantee that the final price provided to users will not exhibit too high variability between similar quote requests.

The unique relationship between the first trained machine learning model and the second trained machine learning model improves the process by which computers predict prices in a variety of ways, underscoring why the present disclosure is an improvement to computers. On one hand, tasking two different trained machine learning model with different tasks (e.g., tasking one with determining the price now, tasking another with determining price fluctuations in the future) allows each model to focus on a specific task in a way that does not result in undesirable inaccuracy from either model. For instance, by training the second trained machine learning model to focus on and predict price fluctuations of automobile transportation prices over time, the model will not undesirably infer strange correlations between unrelated variables (e.g., assuming that price fluctuations are a function of vehicle length). On the other hand, using two different trained machine learning models allows for each model to be updated with a different frequency and with different goals. For instance, as already described above, periodic (e.g., daily) updating of the first trained machine learning model allows that machine learning model to excel at predicting prices in the moment. That said, doing the same with the second trained machine learning model could have undesired consequences, such as causing the model to be too vulnerable to small fluctuations in day-to-day prices. In this way, by using two separate trained machine learning models, each can be updated (e.g., discarded and trained anew; further trained) in a manner that optimally benefits its individual training goals.

As part of step 501 and/or step 502, the one or more machine learning servers 302*a* may perform data collection for the purposes of generating training data. Data collection may comprise automated process that collects data for already completed vehicle transportation activities. Such collected data might be limited to a timeframe, such as from 2013 to the present time, as such a time range ensures that the most recent orders are included in the data (note that the time range may be extended further backwards in time, or closer to the present date, depending on the availability of the data). Such data may include, for example, a creation date and time of the order (e.g., when the order was created), distance information (e.g., the distance between the origin location and destination location), shipment type information (e.g., an indicator if a shipment trailer was open or closed), operability information (e.g., whether the vehicle(s) transported were operable), classic car information (e.g., whether the vehicle(s) transported were older than a certain year), vehicle dimension information (e.g., a height, width, and length of the vehicle(s) transported), GPS coordinate information (e.g., GPS coordinates of the origin location and destination location), elevation information corresponding to the origin location and destination location, housing density information corresponding to the origin location and destination location, housing unit information corresponding to the origin location and destination location, land area information corresponding to the origin location and destination location, population information corresponding to the origin location and destination location, population density information corresponding to the origin location and destination location, water area information corresponding to the origin location and destination location, carrier pay information (e.g., the price paid to the carrier for the delivery), and/or identifier(s) of the shippers. Such data might be collected, for example, from company and publicly available sources such as company private database for order prices and order details, public sources such as US Census: 2010 decennial census, 2019 US Gazetteer Files for geographical and other data.

As part of step 501 and/or 502, training data may be processed. Data cleaning steps may be performed. For example, outliers and/or invalid values may be removed from the training data to ensure better accuracy for the machine learning models. Moreover, data augmentation may be performed based on observations relating to automobile shipping trends. For example, training data may be segregated by region (e.g., U.S. states), by quantity of data points available per region (e.g., the number of data points available per state), or the like. Such processing may be performed because the market behavior is not the same across all U.S. states, because the number of orders is large for some U.S. states but there are some states with few data points, and/or because price predictions might not be accurate for orders coming from states with relatively fewer orders. In turn, such augmentation may comprise adding, to the training data, data such as U.S. state codes corresponding to GPS coordinates and/or ZIP codes and/or by adding pickup and delivery region identifiers to the training data. For example, the training data may be processed such that, for each data entry comprising a location identifier (e.g., origin location, destination location), state and/or region codes may be added to such entries.

As part of step 501 and/or 502, data drift protections may be implemented. As part of the process of training and/or using machine learning models, data drifts and/or label drifts may be introduced artificially. For example, training a new version of the first trained machine learning model using prices that were predicted from the previous version of the model may lead to a skew of the real prices (e.g., may cause the machine learning model to slowly overestimate the price of certain shipments). To prevent such skew, training data for the trained machine learning models may be selected in a way that minimizes the possibility of such drifts. Large amounts of training data points may be included, and the training data included may include data points where the final price has been confirmed/processed/changed/negotiated by a professional broker (e.g., rather than a machine learning model). Moreover, data points from multiple different vehicle shipping companies may be used. In addition, a custom monitoring module may be used for detecting drifts by comparing our predictions to external data about the market state.

As part of step 501 and/or 502, large error protections may be implemented. A problem might arise when one or more of the trained machine learning models model starts predicting too high a fraction of all orders to be either priced below the market price or above the market price. In general, it may be desirable to ensure that the number of predictions below and above the market prices are balanced. After all, if the price of a load is below the market price, a carrier might not be interested in it whereas, if the price is above the market price, the person shipping the load might not agree to it. Leaning too much in either direction may therefore cause problems and discourage reliance on the machine learning model(s). To prevent such disbalance, if a fraction is above a specific threshold, the training data may be modified to, for example, select greater or fewer data points with higher or lower prices. Once modified, the final prices may be adjusted automatically upwards or downwards keeping the overall model error within reasonable limits.

Step 501 and/or step 502 may be repeated periodically and in a "blue green" deployment model. In such a model, the old version of a trained machine learning model may be referred to as the "blue" environment, while the new version of the trained machine learning model may be referred to as the "green" environment. Once production traffic is fully transferred from blue to green, blue can be configured to wait in standby in case of rollback or pulled from production and updated to become the template upon which the next update is made. Such "blue green" deployment is widely used in the IT industry application release model because it increases a system's availability to server user requests with high quality. In other words, such an approach may ensure the gradual transfer of user traffic from a previous version of an app or microservice to a nearly identical new release—both of which are running in production.

As indicated above, either or both the first trained machine learning model and/or the second trained machine learning model may be periodically re-trained and/or re-generated. For example, the computing device may determine a time associated with the generation of the first trained machine learning model and, based on determining that the time satisfies a threshold, discard the first trained machine learning model, update the first training data, and generate a new version of the first trained machine learning model by training, based on the updated first training data, the first machine learning model to output the price prediction for automobile transportation.

In step 503, the computing device may receive a request for automobile transportation. Step 503 may be the same or similar as step 402 of FIG. 4. The request may comprise information relating to automobile transportation, such that it might include information about the vehicle(s) to be shipped, the time when those vehicle(s) are to be shipped, an origin location, a destination location, and the like. For example, the computing device may receive, via a user interface of an application executing on a user device, a request for automobile transportation that indicates an origin location, a destination location, a vehicle identifier, and a transportation time.

The request for automobile transportation received in step 503 may be received via an API. Such an API may permit a request to comprise data such as a origin location (e.g., a pickup zip code, such as the US postal code of the district or region from which the vehicle will be picked up and sent), a destination location (e.g., a delivery zip code, such as the US postal code of the district or region from which the vehicle will be picked up and sent), a list of vehicles to be transported (and, e.g., a year, make, model, VIN, and/or running indication of each vehicle), an estimated shipping date for the vehicle(s) (e.g., as entered in the ISO-8601 format), and/or an indication of whether the vehicle(s) are to be transmitted in an enclosed vehicle.

In step 504, the computing device may receive vehicle data. This process may entail querying a database, such as the one or more schedule databases 302c, for information. For example, the computing device may receive, from a database and based on the vehicle identifier, vehicle data. The query process might entail use of all or portions of the request for automobile transportation received in step 503.

For example, the request for automobile transportation received in step 503 may comprise vehicle make/model/year information, and that make/model/year information might be used to query the one or more schedule databases 302c for weight/height/width/length information. Step 504 may be the same or similar as step 403 of FIG. 4.

In step 505, the computing device may provide input to the first trained machine learning model. The input may comprise all or portions of data received as part of the request for automobile transportation received in step 503 and/or the vehicle data received in step 504. For example, the computing device may provide, as input to the first trained machine learning model, the origin location, the destination location, and the vehicle data. In this manner, the computing device may thereby provide, as input to the first trained machine learning model, a variety of information about the requested automobile transportation.

In step 506, the computing device may receive a predicted automobile transportation price from the first trained machine learning model. As part of this step, the computing device might receive a price from one or more of the output nodes of the first trained machine learning model. For example, the computing device may receive, as output from the first trained machine learning model, a predicted automobile transportation price. Step 505 and step 506 may be the same or similar as step 404 of FIG. 4.

In step 507, the computing device may provide input to the second trained machine learning model. The input provided to the second trained machine learning model may comprise all or portions of the output of the first trained machine learning model. In addition to and/or alternative to that output, timing information (e.g., about when the automobile shipping is requested) may be provided. For example, the computing device may provide, as input to the second trained machine learning model, the predicted automobile transportation price and the transportation time. In this manner, the second trained machine learning model may be provided data such as the predicted price, the time (e.g., now) that the price corresponds to, and the time when the automobile transportation is actually requested.

In step 508, the computing device may receive a predicted price change from the second trained machine learning model. The predicted price change may be some form of an indication of how prices might change between the time when the request for automobile transportation is received (e.g., in step 503) and the time when the automobile transportation is actually requested (e.g., weeks from now). For example, the computing device may receive, as output from the second trained machine learning model, a predicted price change. Such a price change might be output as a fraction, a decimal value, or a similar value that can be used to modify the predicted automobile transportation price received as part of step 506. Step 507 and step 508 may be the same or similar as step 405 of FIG. 4.

In step 509, the computing device may generate a modified price prediction. The modified price prediction might comprise a price that is based on both the predicted automobile transportation price received in step 506 and the predicted price change received in step 508. For example, the computing device may generate a modified price prediction by modifying the predicted automobile transportation price based on the predicted price change. This process might involve multiplying the two values. For example, the predicted automobile transportation price received in step 506 might be $1000, the predicted price change received in step 508 might be 1.1 (that is, a 10% increase), and the two values might be multiplied to result in a $1,100 modified price prediction. Step 509 may be the same or similar as step 406 of FIG. 4.

In step 510, the computing device may output the modified price prediction. Output of the modified price prediction might comprise presenting an opportunity for a user to accept or reject the offer. This may comprise output in a user interface, such as a user interface of the interface application 304 of the one or more user devices 303. For example, the computing device may cause output, in the user interface, of the modified price prediction. Step 510 may be the same or similar as step 407 of FIG. 4.

In step 511, the computing device may determine whether user input has been received. The computing device may be configured to regularly monitor for user input (e.g., a response to the output in step 510). In turn, step 511 may comprise determining whether user input has been detected. Step 511 may be the same or similar as step 408 of FIG. 4. If user input is received, the method 500 proceeds to step 512. If no user input is received, the method 500 proceeds to step 513.

The user input received as part of step 511 may indicate a variety of different things. In some cases, the user input may indicate whether the user accepted the modified price prediction. In such a case, whether the user accepts the modified price prediction might be used to automate subsequent steps, such as directing a vehicle towards a pickup location. In some cases, the user input may indicate whether the user thinks that the price is too high and/or low. For example, a user might click on a "thumbs down" user interface element, indicating that they think the price is too high. In such a circumstance, In step 512, the computing device may transmit an indication of the request. This step may comprise transmitting data that implements all or portions of the automobile transportation requests. For example, the computing device may, based on receiving, via the user interface, user input, transmit, to a server, an indication of the request for automobile transportation and the modified price prediction. The server might be, for example, the one or more schedule databases 302c, such that the transmission may cause the automobile transportation request to be added to a schedule. As another example, the computing device may transmit, to a Global Positioning System (GPS) device (e.g., the one or more GPS devices 305), an indication of the destination location. The computing device may thereby automate a portion of the request by causing a vehicle (e.g., a self-driving vehicle or a human-driven vehicle) to be directed towards the destination location for vehicle pick-up.

As suggested by the discussion of GPS devices above, transmission of the indication of the request may comprise automating all or portions of the carrier navigation process. Carriers (e.g., drivers of a vehicle capable of transporting other vehicles) may use GPS devices to navigate from location to location. Some of these GPS devices might simply provide directions (e.g., turn-by-turn navigation), whereas others might be used as part of an autonomous driving system (e.g., used by a computing device to automatically drive). In either circumstance, as part of step 512, transmitting the indication of the request may comprise transmitting pickup and/or drop-off coordinates.

Transmission of the indication of the request may additionally and/or alternatively comprise calculation of an optimized route for transportation of a vehicle. The computing device may, for example, transmit data (e.g., all or portions of data received as part of the request for automobile transportation received in step 503 and/or the vehicle data received in step 504, and/or the modified price prediction) to a route optimization algorithm configured to find cost-effective routes for transportation based on, e.g., the modified price prediction, fuel costs, time, and carrier revenue/profits. For instance, if the modified price prediction is relatively high (e.g., for a vintage/rare vehicle), transportation routes that use more gas but that are relatively safer/slower might be preferred. In contrast, if the modified price prediction is relatively low (e.g., for a budget vehicle), faster transportation routes that are more economically efficient might be prioritized. Output from the route optimization algorithm might be taken into consideration when transmitting instructions to GPS devices, as described above.

Transmission of the indication of the request may additionally and/or alternatively comprise instantiation of one or more insurance policies. Some insurance companies base their insurance policy on, among other things, the type of vehicle and predicted transportation price. Along those lines, information collected by the computing device (e.g., all or portions of data received as part of the request for automobile transportation received in step 503 and/or the vehicle data received in step 504, and/or the modified price prediction) to an insurance company server. Such a transmission may cause instantiation of an insurance policy for the transportation.

Transmission of the indication of the request may comprise transmission of a carrier recommendation. The modified price prediction may indicate or otherwise suggest one or more carriers for transporting a vehicle. For instance, the modified price prediction may itself indicate a recommended carrier, and/or the price point of the modified price prediction may itself suggest carriers (e.g., because the price is of a value that is only handled by budget carriers). In this manner, the modified price prediction may be used to automatically select an appropriate carrier.

Transmission of the indication of the request may comprise transmission of data to a server that maintains an industry index. For example, predictions relating to future transportation might be stored by a database for the purposes of predicting future market fluctuations. In turn, this information might be useful to identify circumstances where transportation expenses are expected to rise or fall.

In step 513, the computing device may further train one or both of the machine learning models. Either or both of the trained machine learning models may be trained based on user reactions to prices to the modified price prediction. For instance, if a user reacts negatively to the modified price prediction, this may (in certain circumstances) indicate that the price is too high. In such a circumstance, the computing device may further train the first trained machine learning model based on the user input.

At any point during the steps depicted in FIG. 5, the computing device may be configured to update the first trained machine learning model based on determining that its output is trending in a particular manner. After all, if the first trained machine learning model continues to provide continually overly-high prices, then it may be desirable to discard and train the first trained machine learning model anew. For instance, the computing device may determine a predicted automobile transportation price prediction trend by monitoring output from the first trained machine learning model and, based on determining that the predicted automobile transportation price prediction trend satisfies a threshold, discard the first trained machine learning model, update the first training data by removing one or more portions of the first training data, and generate a new version of the first trained machine learning model by training, based on the updated first training data, the first machine learning model to output the price prediction for automobile transportation.

Figure 6:
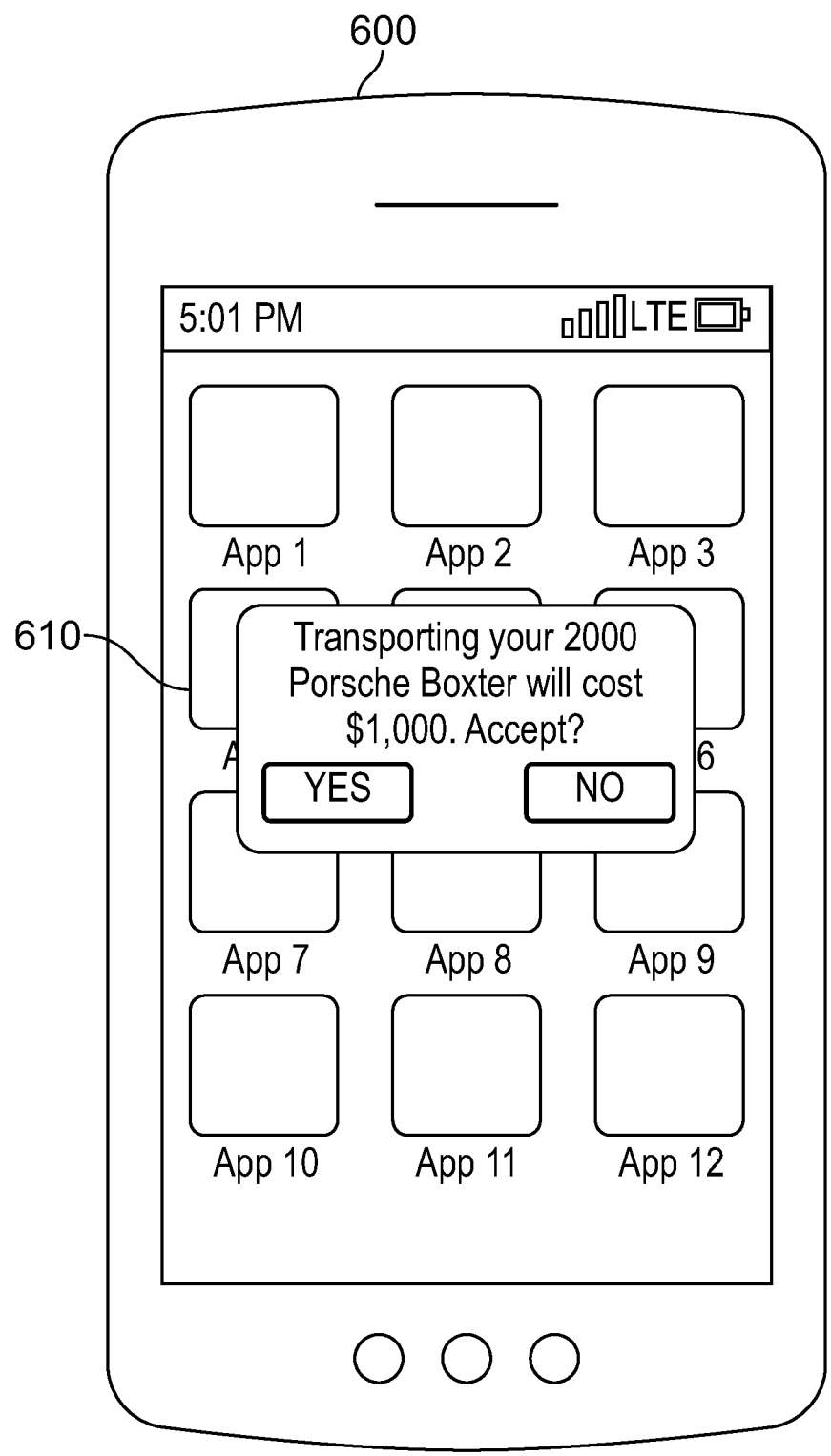
FIG. 6 shows an example of a notification.

FIG. 6 shows an example of a mobile device 600 (which may be the same or similar as the one or more user devices 303) showing a notification 610 (which may be displayed via the interface application 304). The notification 610 may, as shown in FIG. 6, indicate a price prediction, which may be based on the output from the first trained machine learning model and the second trained machine learning model. As such, FIG. 6 provides a simple example of how a modified price prediction might be displayed as part of step 510 of FIG. 5.

FIG. 7 shows an example of a JSON payload that may be submitted via an API as part of a request for automobile transportation. This payload may be submitted from the one or more user devices 303 and via the interface application 304 to the one or more machine learning servers 302 as, for example, part of step 503 of FIG. 5.

Figure 8:
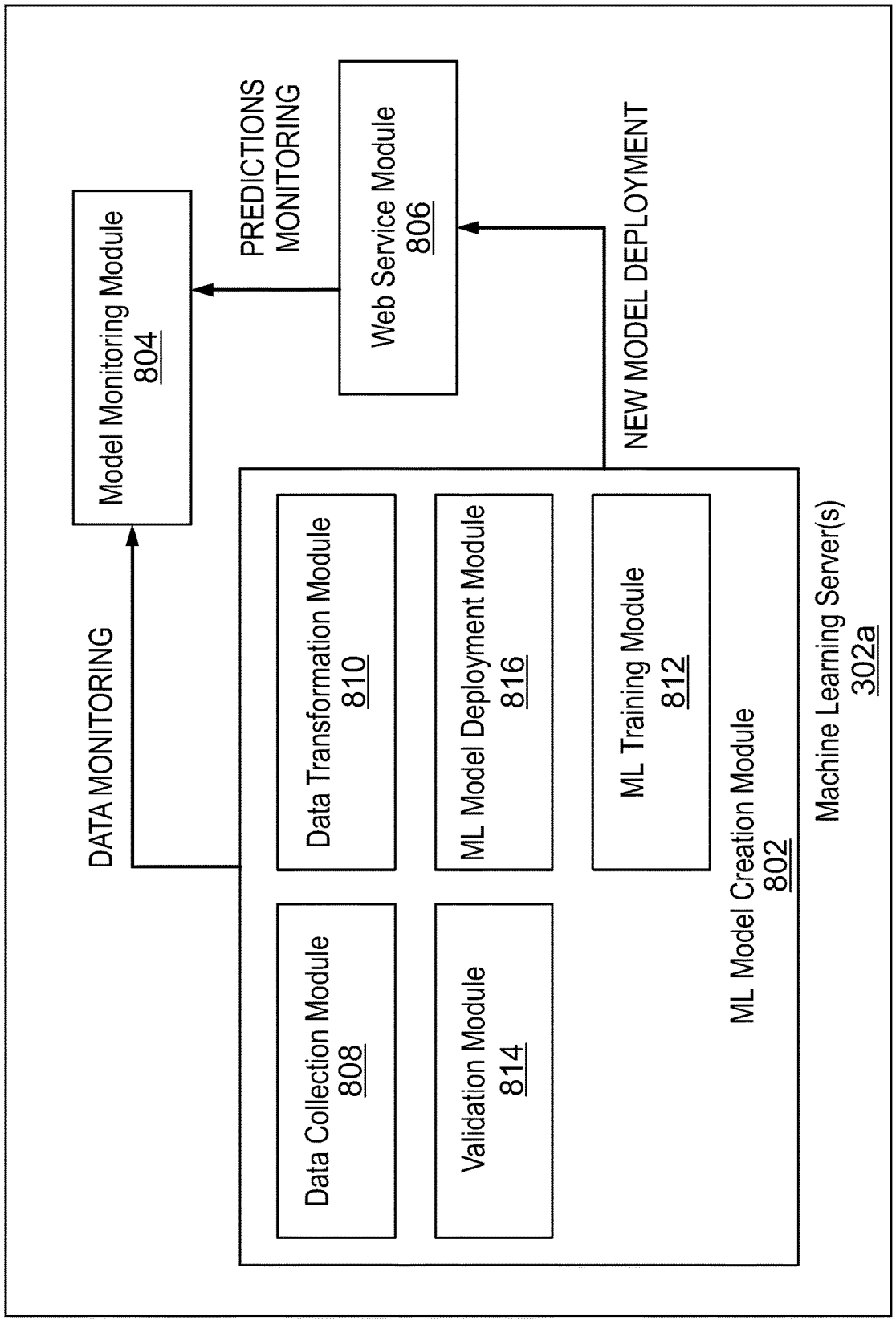
FIG. 8 is a block diagram of the modules that may be implemented by one or more machine learning servers.

FIG. 8 is a block diagram of the modules that may be implemented by the one or more machine learning servers 302*a*. Three main modules are displayed: a ML model creation module 802, a model monitoring module 804, and a web service module 806. The ML model creation module 802 may be responsible for regular training and deployment of the machine learning models. The ML model creation module 802 includes a data collection module 808 (which collects all the necessary data), a data transformation module 810 (which cleans and transforms the data and/or derives all machine learning features from the raw data), a ML training module 812 (which trains the machine learning models), a validation module (which performs checks on the raw data, the ML features and on the accuracy of the machine learning models such that, if the data or the models do not meet predefined quality levels, the module short circuits the whole process to prevent uploading degraded models in production), and a ML model deployment module 816 (which uploads the deliverable of the training process to a central store such that it is made accessible to other parts of the system).

Figure 9:
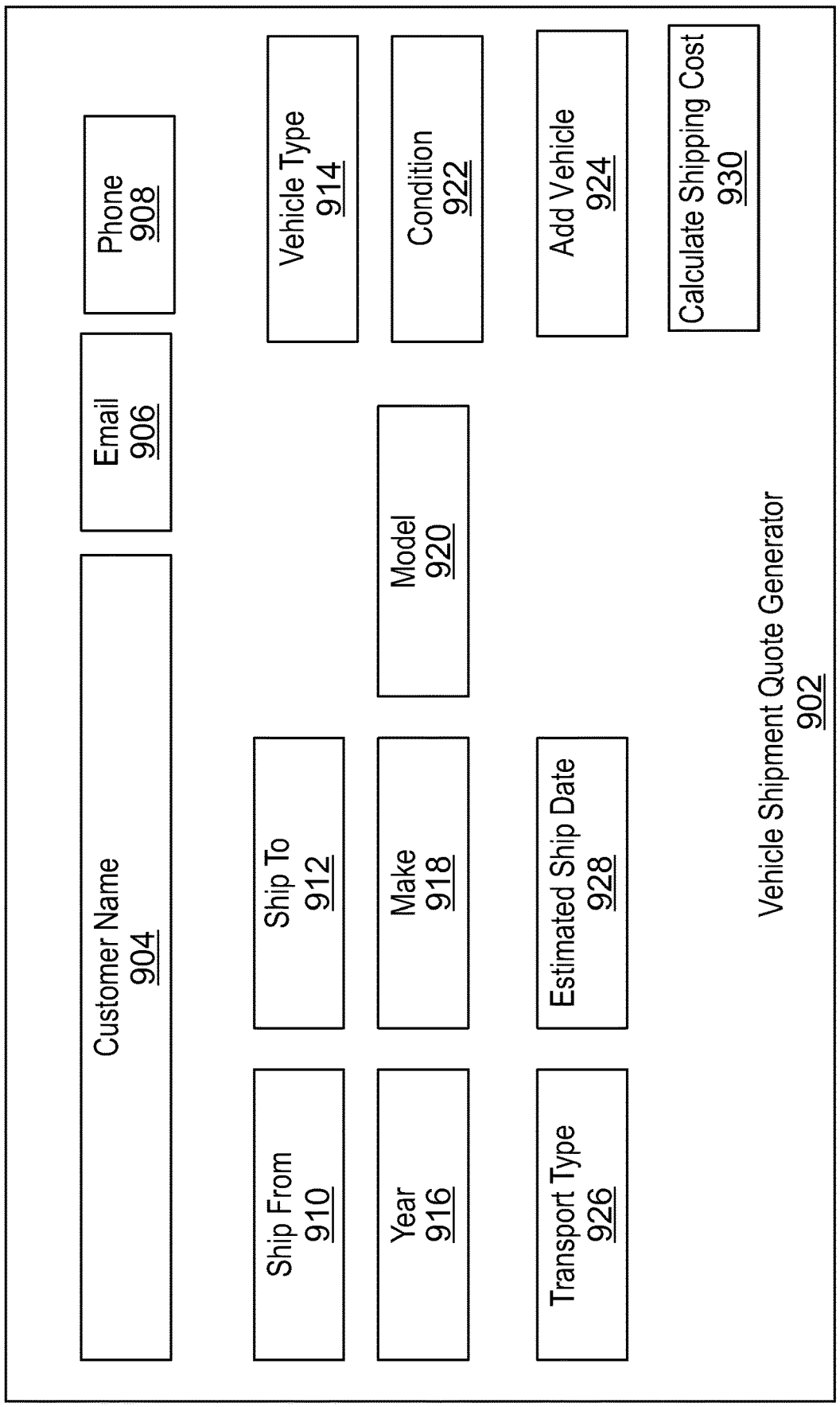
FIG. 9 is an example web page which may be displayed by an interface application and may be used to submit a request for automobile transportation.

FIG. 9 is an example web page which may be displayed by the interface application 304 and may be used to submit a request for automobile transportation. The user of the system may be served this web page so the system can obtain the required variables regarding the desired shipment. The user enters the customer name at field 904, their email data at field 906, and their phone number at field 908. Additional user data may be requested if desired. The shipment origination location may be entered into field 910, and the desired destination location is entered at field 912. This may be a specific address or just a zip code if desired. Next, information on the vehicle is entered at fields 916 (model year), 918 (make), 920 (model), 914 (type—e.g., automobile or motorcycle), and 922 (condition of vehicle). An add vehicle button 924 may be used to allow the user to enter the data and then add additional vehicles if desired. Next, the transportation type is added at field 926 (e.g., open or closed trailer), and the estimated shipment date is added at field 928. Finally, the data set is submitted to the system by entering the calculated shipping cost button 930.

Once data is submitted via the web page depicted in FIG. 9, the data provided may be securely transferred (e.g., via HTTPS) to the web service module 806 of FIG. 8. This module may use the user's data to fetch additional information from databases such as the one or more vehicle data databases 302b. Such data may be transformed into vectors and/or lists of numbers, which may be used as input to the machine learning models.

FIG. 10A shows a first user interface 101 configured to receive origin and destination information. The first user interface 1001 might be displayed as part of receiving the request for automobile transportation in step 402 of FIG. 4 and/or receiving the request for automobile transportation as part of step 503 of FIG. 5. The first user interface 1001 is shown requesting information such as an origin/pickup location ("Transport Car FROM"), a destination location ("Transport Car TO"), and whether the vehicle is to be transported in an open or a closed container.

FIG. 10B shows a second user interface 1002 configured to receive vehicle make, model, year, and operability information. The second user interface 1002 might be displayed as part of receiving the request for automobile transportation in step 402 of FIG. 4 and/or receiving the request for automobile transportation as part of step 503 of FIG. 5. The second user interface 1002 is shown requesting information such as vehicle year, make, and model, and whether the vehicle is still operable.

FIG. 10C shows a third user interface 1003 configured to receive contact information and availability information. The third user interface 1003 might be displayed as part of receiving the request for automobile transportation in step 402 of FIG. 4 and/or receiving the request for automobile transportation as part of step 503 of FIG. 5. The third user interface 1003 is shown requesting information such as a user's e-mail address, the first available date of the vehicle, and the phone number of the user.

FIG. 10D shows a fourth user interface 1004 configured to provide quote information. The fourth user interface 1004 might be displayed as part of transmitting the modified price prediction in step 407 of FIG. 4 and/or as part of outputting the modified price prediction as part of step 510. The fourth user interface 1004 is shown as displaying a discounted cash price as well as a regular price, either or both reflecting the modified price prediction that might have been generated as part of step 509 of FIG. 5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device for automatically generating a plurality of machine learning models and one or more requests for automobile transportation, the computing device comprising:
one or more processors; and
memory storing instructions that, when executed by the one or more processors, cause the computing device to:
generate a base machine learning model by training, based on first training data indicating a history of automobile shipping costs and corresponding shipment information, the base machine learning model to output a current price prediction for automobile transportation, wherein training the base machine learning model comprises weighting, based on the first training data, one or more first nodes of a first artificial neural network;
generate a correction machine learning model, wherein the correction machine learning model is independent from the base machine learning model, by training, based on second training data indicating a history of automobile shipping costs over time, the correction machine learning model to output a predicted price change based on a prediction of automobile transportation price changes over a future time period, wherein training the correction machine learning model comprises weighting, based on the second training data, one or more second nodes of a second artificial neural network;
receive, via a user interface of an application executing on a user device, request data comprising an origin location, a destination location, a vehicle identifier, and a transportation time;
receive, from a database and based on the vehicle identifier, vehicle data;
provide, as input to the base machine learning model, the origin location, the destination location, and the vehicle data;
receive, as output from the base machine learning model, a predicted automobile transportation price;
provide, as input to the correction machine learning model, the predicted automobile transportation price and the transportation time;
receive, as output from the correction machine learning model, the predicted price change;
generate a modified price prediction via the base machine learning model by modifying the predicted automobile transportation price based on the predicted price change;
in response to receiving a user input comprising the request data from the user interface, generate an automatically generated request for automobile transportation via the correction machine learning model based on the user input, the request data, the vehicle data, and the modified price prediction;
control a server to modify one or more schedule databases according to the automatically generated request for automobile transportation; and
further train the base machine learning model by modifying the base machine learning model based on the user input.

2. The computing device of claim 1, wherein the instructions, when executed by the one or more processors, further cause the computing device to:
determine a predicted automobile transportation price prediction trend by monitoring output from the base machine learning model;
based on determining that the predicted automobile transportation price prediction trend satisfies a threshold:
discard the base machine learning model;
update the first training data by removing one or more portions of the first training data; and
generate a new version of the base machine learning model by training, based on the updated first training data, the base machine learning model to output a price prediction for automobile transportation.

3. The computing device of claim 1, wherein the instructions, when executed by the one or more processors, further cause the computing device to:
determine a time associated with the generation of the base machine learning model; and
based on determining that the time satisfies a threshold:
discard the base machine learning model;
update the first training data; and
generate a new version of the base machine learning model by training, based on the updated first training data, the base machine learning model to output a price prediction for automobile transportation.

4. The computing device of claim 1, wherein the instructions, when executed by the one or more processors, further cause the computing device to automate a carrier navigation process by controlling a Global Positioning System (GPS) device based on the destination location.

5. The computing device of claim 1, wherein the instructions, when executed by the one or more processors, further cause the computing device to:
weight different portions of the first training data based on a recency of each different portion of the first training data.

6. The computing device of claim 1, wherein the corresponding shipment information indicates one or more of:
vehicle weight,
vehicle dimensions,
whether a vehicle is capable of being driven; or
whether the vehicle is transported in a closed container.

7. The computing device of claim 1, wherein the predicted price change comprises a comparison between the transportation time and a time when the request for automobile transportation is received.

8. A method for automatically generating a plurality of machine learning models and one or more requests for automobile transportation, the method comprising:
generating a base machine learning model by training, based on first training data indicating a history of automobile shipping costs and corresponding shipment information, the base machine learning model to output a current price prediction for automobile transportation, wherein training the base machine learning model comprises weighting, based on the first training data, one or more first nodes of a first artificial neural network;
generating a correction machine learning model, wherein the correction machine learning model is independent from the base machine learning model, by training, based on second training data indicating a history of automobile shipping costs over time, the correction machine learning model to output a prediction of how an automobile transportation price will change over a time period, wherein training the correction machine learning model comprises weighting, based on the second training data, one or more second nodes of a second artificial neural network;
receiving, via a user interface of an application executing on a user device, request data comprising an origin location, a destination location, a vehicle identifier, and a transportation time;
receiving, from a database and based on the vehicle identifier, vehicle data;
providing, as input to the base machine learning model, the origin location, the destination location, and the vehicle data;
receiving, as output from the base machine learning model, a predicted automobile transportation price;
providing, as input to the correction machine learning model, the predicted automobile transportation price and the transportation time;
receiving, as output from the correction machine learning model, a predicted price change;
generating a modified price prediction via the base machine learning model by modifying the predicted automobile transportation price based on the predicted price change;
in response to receiving a user input comprising the request data from the user interface, generating an automatically generated request for automobile transportation via the correction machine learning model based on the user input, the request data, the vehicle data, and the modified price prediction;
controlling a server to modify one or more schedule databases according to the automatically generated request for automobile transportation; and
further training the base machine learning model by modifying the base machine learning model based on the user input.

9. The method of claim 8, further comprising:
determining a predicted automobile transportation price prediction trend by monitoring output from the base machine learning model;
based on determining that the predicted automobile transportation price prediction trend satisfies a threshold:
discarding the base machine learning model;
updating the first training data by removing one or more portions of the first training data; and
generating a new version of the base machine learning model by training, based on the updated first training data, the base machine learning model to output a price prediction for automobile transportation.

10. The method of claim 8, further comprising:
determining a time associated with the generation of the base machine learning model; and
based on determining that the time satisfies a threshold:
discarding the base machine learning model;
updating the first training data; and
generating a new version of the base machine learning model by training, based on the updated first training data, the base machine learning model to output a price prediction for automobile transportation.

11. The method of claim 8, further comprising automating a carrier navigation process by controlling a Global Positioning System (GPS) device to direct a vehicle based on the destination location.

12. The method of claim 8, further comprising:
weighting different portions of the first training data based on a recency of each different portion of the first training data.

13. The method of claim 8, wherein the corresponding shipment information indicates one or more of:
vehicle weight,
vehicle dimensions,
whether a vehicle is capable of being driven; or
whether the vehicle is transported in a closed container.

14. The method of claim 8, wherein the predicted price change comprises a comparison between the transportation time and a time when the request for automobile transportation is received.

15. One or more non-transitory computer-readable media storing instructions for automatically generating a plurality of machine learning models and one or more requests for automobile transportation, wherein the instructions, when executed by one or more processors of a computing device, cause the computing device to:
generate a base machine learning model by training, based on first training data indicating a history of automobile shipping costs and corresponding shipment information, the base machine learning model to output a current price prediction for automobile transportation, wherein training the base machine learning model comprises weighting, based on the first training data, one or more first nodes of a first artificial neural network;

generate a correction machine learning model, wherein the correction machine learning model is independent from the base machine learning model, by training, based on second training data indicating a history of automobile shipping costs over time, the correction machine learning model to output a prediction of how an automobile transportation price will change over a time period, wherein training the correction machine learning model comprises weighting, based on the second training data, one or more second nodes of a second artificial neural network;

receive, via a user interface of an application executing on a user device, request data comprising an origin location, a destination location, a vehicle identifier, and a transportation time;

receive, from a database and based on the vehicle identifier, vehicle data;

provide, as input to the base machine learning model, the origin location, the destination location, and the vehicle data;

receive, as output from the base machine learning model, a predicted automobile transportation price;

provide, as input to the correction machine learning model, the predicted automobile transportation price and the transportation time;

receive, as output from the correction machine learning model, a predicted price change;

generate a modified price prediction via the base machine learning model by modifying the predicted automobile transportation price based on the predicted price change;

in response to receiving a user input comprising the request data from the user interface, generate an automatically generated request for automobile transportation via the correction machine learning model based on the user input, the request data, the vehicle data, and the modified price prediction;

control a server to modify one or more schedule databases according to the automatically generated request for automobile transportation; and further train the base machine learning model by modifying the base machine learning model based on the user input.

16. The one or more non-transitory computer-readable media of claim 15, wherein the instructions, when executed by the one or more processors, further cause the computing device to:

determine a predicted automobile transportation price prediction trend by monitoring output from the base machine learning model;

based on determining that the predicted automobile transportation price prediction trend satisfies a threshold:

discard the base machine learning model;

update the first training data by removing one or more portions of the first training data; and generate a new version of the base machine learning model by training, based on the updated first training data, the base machine learning model to output a price prediction for automobile transportation.

17. The one or more non-transitory computer-readable media of claim 15, wherein the instructions, when executed by the one or more processors, further cause the computing device to:

determine a time associated with the generation of the base machine learning model; and based on determining that the time satisfies a threshold:

discard the base machine learning model;

update the first training data; and generate a new version of the base machine learning model by training, based on the updated first training data, base machine learning model to output a price prediction for automobile transportation.

18. The one or more non-transitory computer-readable media of claim 15, wherein the instructions, when executed by the one or more processors, further cause the computing device to automate a carrier navigation process by controlling a Global Positioning System (GPS) device to direct a vehicle based on the destination location.

19. The one or more non-transitory computer-readable media of claim 15, wherein the instructions, when executed by the one or more processors, further cause the computing device to:

weight different portions of the first training data based on a recency of each different portion of the first training data.

20. The one or more non-transitory computer-readable media of claim 15, wherein the corresponding shipment information indicates one or more of:

vehicle weight, vehicle dimensions, whether a vehicle is capable of being driven; or whether the vehicle is transported in a closed container.

* * * * *